Nov. 25, 1952     O. MAISCH     2,619,040
LIQUID MEASURING AND DISPENSING PUMP
Filed March 15, 1949
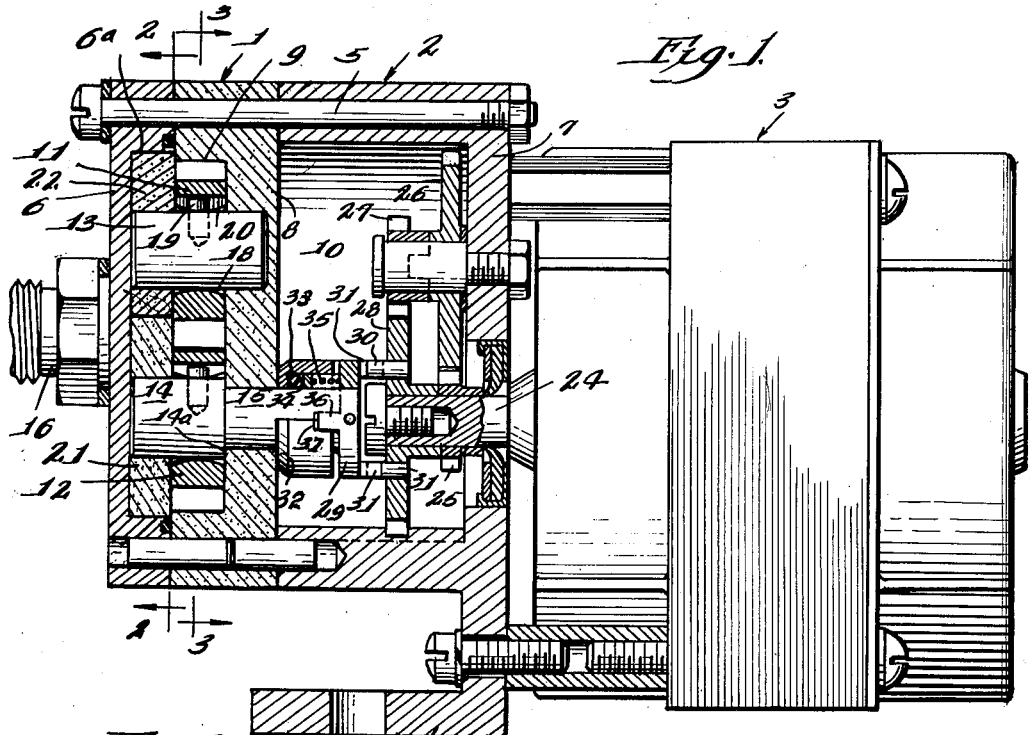
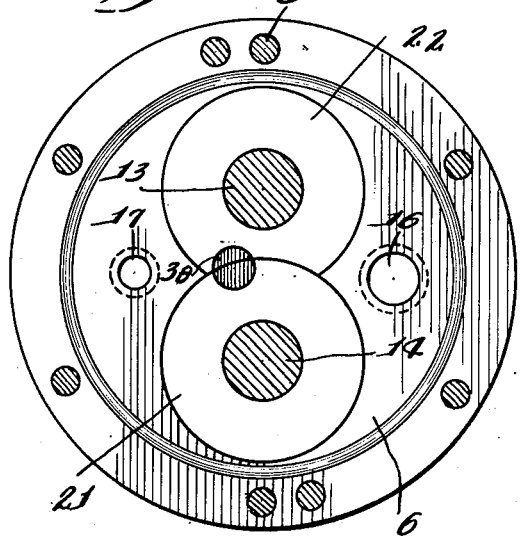
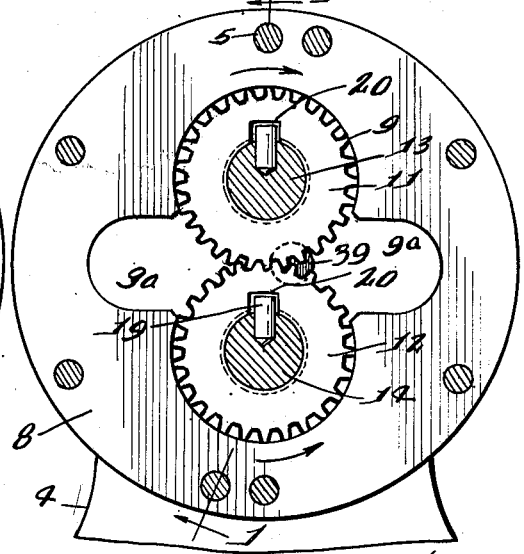
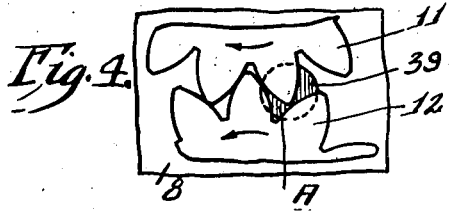
Inventor.
Oliver Maisch,
By Wm F. Freudenreich,
Attorney.

Patented Nov. 25, 1952

2,619,040

UNITED STATES PATENT OFFICE 2,619,040

LIQUID MEASURING AND DISPENSING PUMP

Oliver Maisch, Chicago, Ill.

Application March 15, 1949, Serial No. 81,494

1 Claim. (Cl. 103—126)

In my prior application, Ser. No. 23,523, I have disclosed a simple pump adapted primarily to measure out syrups in the predetermined quantities needed in the dispensing of soft drinks; the pump being of the intermeshing spur gear type. This prior construction, while entirely satisfactory for its intended purpose, is less so in fields where extreme accuracy of measurement of a liquid is required and, especially, where it may be desired that the liquid shall be discharged slowly and in very small volume.

The object of the present invention is to produce a gear pump that shall be adapted to dispense liquids of various kinds at a rate that is accurate and uniform, regardless of whether the quantity to be dispensed in a given time be large or small or whether the timing period be long or short.

Accuracy in measuring the volume of liquid that is being dispensed depends upon having, between the pump gears and the surrounding casing, such a good fit that the liquid is moved ahead just as positively as though it were being forced forward in a cylinder by a piston provided with adequate packing. Such a close fit is impracticable in pumps as heretofore made.

It is therefore a specific object of the present invention so to construct a gear pump, wherein the casing is a sufficiently close fit on the gears to insure great accuracy in calibration, without incurring mechanical difficulties in the manufacture and operation on account of such close fit.

Closeness of fit is possible only when there is no grabbing action between the surfaces that rub against each other, tending to freeze the gears, and when the gears are driven in such a manner that they can freely adjust themselves properly with respect to the casing surfaces engaging the same.

Specific objects of the present invention may therefore be said to build a gear pump of such material that the coefficient of friction between relatively movable contacting surfaces is very low, and so constructed that the rotatable members, although positively driven, are only loosely held and thus may be said to float within the pump casing.

The various features of novelty whereby the present invention is characterized will hereinafter be pointed out with particularity in the claim; but, for a full understanding of the invention and of its various objects and advantages, reference may be had to the following detailed description taken in connection with the accompanying drawings, wherein:

Figure 1 is a view, partly in section on line 1—1 of Fig. 3 and partly in side elevation, of a motor-driven pump embodying the present invention; Fig. 2 is a section on line 2—2 of Fig. 1; Fig. 3 is a section that is in part on line 3—3 of Fig. 1, and in part on line 2—2 of Fig. 1, but looking toward the right in both instances; and Fig. 4 shows fragments of the pump gears and one of the casing walls, in the regions where the gears intermesh.

Referring to the drawing, 1 is a gear pump casing; 2 is a casing for speed reducing gearing, and 3 is an electric motor; all of these parts being shown as separate members bolted together into a single unit. This unit may stand on a base 4 that forms part of casing 2. Casings 1 and 2 are preferably cylindrical and composed of a number of separate parts that are fastened together by long bolts 5 into a single structure containing two end walls 6 and 7, and an intervening partition wall 8 parallel to the latter walls; this structure containing a pump chamber 9 and a chamber 10 for the speed reducing mechanism.

Within the pump chamber are a pair of intermeshing spur gears, 11 and 12, mounted on rotatable shafts 13 and 14, respectively, of relatively large diameter. Shaft 13 is short and merely extends into walls 6 and 8 and is rotatable therein. Shaft 14 extends into wall 6 but bears at its inner end against wall 8. An extension 15, of smaller diameter than shaft 14, passes through wall 8 into chamber 10. Thus an annular shoulder 14ᵃ is left at the end of shaft 14 proper to bear against wall 8. The spur gears engage at their flat sides with walls 6 and 8, and their peripheries fit into and follow the contours of the ends of the pump chamber. As best seen in Fig. 3, the pump chamber comprises end sections curved to fit around the two gears over an angle of more than 180°, together with a central section 9ᵃ in the form of a cross arm. The inlet to the pump chamber is into one end of the transverse part thereof, while the outlet is from the other end of the latter. The inlet and outlet are in end wall 6, as shown in Fig. 2, where 16 represents the inlet and 17 an outlet that is much smaller than the inlet. The large inlet permits one side of the pump chamber to be supplied rapidly enough with liquid to insure that a steady stream may flow through the outlet at the opposite side of the chamber, when the pump is running.

The pump gears are loose on their shafts, the bores 18 through the gears increasing in diameter from the middle toward their ends, so that the gears can rock sidewise. However, each gear is compelled to turn with its shaft by a pin 19 that extends radially from the shaft into a groove 20 in the gear; the groove running parallel to the axis of the gear. Consequently, the gears are floating in the sense that they can find their own seats on the surrounding casing, without being constrained against doing so by their supporting shafts.

In the pump disclosed in my said prior application the pump gears and the walls between which they lie are composed of stainless steel, so that considerable clearance is required to allow the gears to revolve freely. I have found that if at least one of each pair of surfaces on the gears and the casing, that touch each other when there is an unusually close fit between the gears and the casing, is composed of a self lubricating bearing material, the fit may be sufficiently close to insure great accuracy in the amount of liquid pumped without interfering with the free rotation of the gears at all speeds. This holds true even though the gears or the casing, or both, be composed of some non-metallic material. For most purposes, carbon bearing materials of the harder types now in use are satisfactory. However, when certain acids are to be handled some of the plastic compounds, particularly one known as "Teflon," which is a polytetrafluoroethylene-polymer serve my purpose better than does carbon; as this compound will withstand boiling in aqua regia, hydrofluoric acid or fuming nitric acid without change in weight or properties. Nylon may also be used in some instances where "Teflon" would serve.

There are of course many ways in which a pump may be constructed to secure the advantages of my invention. In the drawing I have illustrated a simple arrangement in which metal and carbon are combined in a manner to create a strong, durable structure at a reasonably low cost. In this particular embodiment, as in my aforesaid application, the casing 2 is a cup shaped metal member, while the foundation of end wall 6 is a thick metal plate. The partition wall 8 takes the form of a thick disc of carbon set against the inner face of end wall 6 and recessed to form pump chamber 9 with its central wings 9ª. End wall 6, also, is recessed on its inner side, as at 6ª; and thick discs 21 and 22, a little larger in diameter than the pump gears, are set into this recess and leave the resultant inner face of the wall flat. When walls 6 and 8 are placed against each other, the carbon discs 21 and 22 form a cover for the pump chamber, as well as bearings for one end of each of the shafts 13 and 14.

The speed reducing gearing is substantially the same as in my prior pump except that none of the driving gears or pinions is on shaft section 15. The motor shaft 24 has fixed thereon a pinion 25 that meshes with a large gear wheel 26 mounted on end wall 7. Rotatable with gear 26 is a second pinion 27 that meshes with a large gear wheel 28 that is loose on the motor shaft but is held against movement lengthwise of the shaft. Shaft section 15 has a thick collar 29 fixed on its end close to the end of the motor shaft. Gear wheel 28 has thereon a pair of pins 30 that extend toward collar 29; whereas the collar is provided with lugs 31 that are engaged by the pins which thus serve to turn shaft section 15 whenever the motor shaft turns. Therefore shaft 14, with its extension 15, is of the floating type, carrying none of the driving wheels and being subjected only to balanced turning forces that do not restrain it against lengthwise movement.

Loose on shaft section 15 is a deep cup-shaped element 32 whose flat bottom bears against wall 8. Within the cup is an O ring sealing element 33 fitting on the shaft. Also in the cup, outwardly from the sealing element, is a washer 34, and between the washer and the collar, around the shaft, is a compression spring 35. Members 29 and 32 are loosely coupled together by means of pins 36 on member 29 extending into notches 37 in the rim of the cup. With this arrangement, the shaft 14, with its extension 15 and all parts on the latter turn as a single unit, wall 8 is yieldingly clamped between shoulder 14ª on shaft 14 and the flat bottom of cup 32. Therefore, because the pump gear 12 is not fixed to shaft 14 and that shaft is not restrained by the driving means therefor, a very effective seal against leakage from the pump chamber along shaft section 15 is provided.

It will be seen that, with the gears rotating in the direction of the arrows in Figs. 3 and 4, liquid is carried upwardly and toward the right by gear 11 and downwardly and toward the right by gear 12, from the left hand end of the central portion of the pump chamber and is discharged into the right hand or outlet end of the chamber. Since the outlet end of the chamber is full of liquid while the pump is running, some of the liquid is carried back again from there toward the inlet side or end, between the intermeshing teeth. When the gear teeth are so shaped that there is no backlash, this liquid is trapped in pockets formed between them, these pockets diminishing in size as they traverse the distance from the outlet compartment of the chamber to the inlet compartment; and, the liquid being incompressible, it causes trouble unless means for escape are provided.

In order to permit the trapped liquid to escape from the pockets between intermeshing teeth, I have cut into the inner faces of walls 6 and 8 little recesses 38 and 39, respectively, a little to the outlet side of the plane containing the axes of the gears and midway between such axes. The recesses, which need not be deep, may be round and of a diameter large enough to permit the pocket A in Fig. 4 to remain in communication therewith until the tooth that is partially entered into the pocket moves down and fills the latter.

By providing suitable motor controlling means, the pump may be caused to run very slowly, very rapidly, or at any intermediate speed for any predetermined periods of time; thereby making it possible to deliver any desired accurately measured quantity of liquid, or a liquid flow at any desired, accurately measured rate for any desired length of time.

I claim:

In combination, a pump casing, intermeshing pump gears in the casing, a shaft for one of said gears interlocked therewith to compel the gears to turn in unison and be relatively movable axially of the shaft, said shaft having a shoulder bearing against the inner side of the casing wall and an extension passing outwardly through such wall, means mounted on said extension yieldingly to hold said shoulder against said wall, a motor-driven speed-reducing means terminating in a rotatable part coaxial with the shaft and adjacent to the outer end of the latter, and an interlock between said shaft and said rotatable part which allows them free relative axial movements while compelling rotary movements in unison with each other.

OLIVER MAISCH.

(References on following page)

REFERENCES CITED

The following references are of record in the file of this patent:

UNITED STATES PATENTS

| Number | Name | Date |
|---|---|---|
| 877,861 | Radu | Jan. 28, 1908 |
| 1,785,386 | McIntyre | Dec. 16, 1930 |
| 1,834,754 | Whaley | Dec. 1, 1931 |
| 1,854,260 | Hofmann | Apr. 19, 1932 |
| 2,049,797 | Bochmann et al. | Aug. 4, 1936 |
| 2,096,490 | Hansen | Oct. 19, 1937 |
| 2,202,913 | Johnson | June 4, 1940 |
| 2,247,454 | Thomson | July 1, 1941 |
| 2,279,136 | Funk | Apr. 7, 1942 |
| 2,336,294 | Rea | Dec. 7, 1943 |

FOREIGN PATENTS

| Number | Country | Date |
|---|---|---|
| 294,653 | Great Britain | June 6, 1929 |

OTHER REFERENCES

National Carbon Company Inc., Catalogue M-8000-A, Oct. 1944.

National Carbon Company Inc., Catalogue M-9100-A, Jan. 1947.